Patented Apr. 30, 1935

1,999,738

UNITED STATES PATENT OFFICE 1,999,738

PURIFICATION OF POLYNUCLEAR AROMATIC HYDROCARBONS

Mathias Pier, Heidelberg, and Walter Simon, Ludwigshafen-on-the-Rhine, Germany, assignors to I. G. Farbenindustrie Aktiengesellschaft, Frankfort-on-the-Main, Germany No Drawing. Application December 22, 1932, Serial No. 648,433. In Germany January 13, 1928

4 Claims. (Cl. 260—168)

The present application is a continuation-in-part of application Ser. No. 330,629 which relates to improvements in the treatment with hydrogen of aromatic hydrocarbons or derivatives thereof, in particular of unrefined aromatic hydrocarbons, and which has for its object the production of hydroaromatic hydrocarbons. The said process is effected at elevated temperatures above 350° C., under pressure and in the presence of a catalyst immune against sulphur poisoning.

It is the production of pure aromatic hydrocarbons from unrefined aromatic hydrocarbons by treatment with hydrogen at elevated temperatures and under pressure to which the present application is directed.

We have found that polynuclear aromatic hydrocarbons, in particular naphthalene, can be purified with great advantage by treating them with free hydrogen or gases containing the same at elevated temperatures between 280° and 350° C., more particularly between 280° and 320° C., under pressures of at least 10 atmospheres, preferably between 40 and 150 atmospheres, and in the presence of catalysts having a hydrogenating action, such as oxidic metal compounds immune against poisoning by sulphur or substances containing the same, the conditions of temperature, pressure, activity of the catalyst and duration of treatment being so adjusted that the materials under treatment are not converted into lower molecular products by disruption of carbon nuclei or chains and that at least a substantial part of the initial materials is not hydrogenated. In the process according to the present invention each unit of initial material is in contact with the catalyst for about from 15 to 100 seconds depending on the particular inital material and on the conditions of temperatures and pressures employed. As catalysts mainly come into question difficultly reducible oxides of heavy metals, in particular those from the sixth group of the periodic system, as for example the oxides of molybdenum, chromium and tungsten. But also oxides of metals from the other groups, as for example from groups 5 and 7, of the periodic system, such as the oxides of vanadium, manganese, rhenium or of other metals such as cobalt and zinc are of advantage. By difficultly reducible oxides we mean those oxides which are not reduced by hydrogen at a temperature of 350° C. and under a pressure of 200 atmospheres. The said oxides may be advantageously replaced by their compounds with other substances, as for example with oxides of metals or non-metals which by themselves have no or no pronounced catalytic activity.

The catalysts hereinbefore specified may also be employed in admixture with other substances, such as magnesium oxide, aluminium oxide, calcium oxide or they may be applied on to carriers such as active carbon or silica gel or bleaching earths or other substances having a large inner surface.

The part of the products which by the aforedescribed treatment are hydrogenated is the greater the higher are the temperature and the pressure, the greater is the activity of the catalyst and the longer the duration of treatment. The conditions furthermore depend upon the particular initial material to be purified. For example, when treating a crude naphthalene at a temperature of about 350° C. with a catalyst having a medium activity, such as tungstic acid with magnesia or cobalt oxide, under a pressure of 75 atmospheres for about twenty seconds, about between 30 and 40 percent of the final product represent tetrahydronaphthalene, while when operating at a temperature which is about 50° higher, or with a catalyst having a strong activity such as tungstic sulphide or molybdic acid with 10 percent of chromic acid, or under a pressure of about 200 atmospheres or for a duration of about fifty seconds the content of hydrogenated product ranges between about 90 and 98 percent. If it is desired to obtain purified products containing no hydrogenated constituents the conditions should be somewhat milder. To this end for example temperatures between 320° and 340° C. are chosen under a pressure of about 20 atmospheres in the presence of a catalyst having a medium activity and with a duration of about 20 seconds. The temperature may also be chosen higher or lower corresponding to the other conditions being selected milder or stronger.

In any event decomposition of the initial materials to form products having a lower number of carbon atoms in the molecule should be prevented. For this purpose temperatures exceeding 425° C. should not be employed.

It is preferable to operate at a temperature ranging between 300° and 400° C., under a pressure between 20 and 250 or more atmospheres and for a duration between about 15 and 100 seconds.

Instead of crude naphthalene, other crude polynuclear hydrocarbons such as anthracene or phenanthrene, may be treated with the same success. With these latter hydrocarbons the conditions to be employed are somewhat milder in order to obtain corresponding results as in the case of crude naphthalene.

The following example will further illustrate how the invention is carried out in practice; the invention is, however, not restricted to the particular operations there described.

*Example*

A crude naphthalene containing 0.23 percent of sulphur, which when dissolved in concentrated sulphuric acid gives a black coloration and which contains the usual small amounts of impurities such as phenols, basic substances, coumarones and the like, is passed together with hydrogen at a temperature of 350° C. and under a pressure of 40 atmospheres over a catalyst consisting of molybdic acid, zinc oxide and magnesia. The resulting mixture consists of purified and hydrogenated naphthalene. These constituents of the mixture may be separated from each other by distillation or by crystallizing out the naphthalene at a low temperature and then filtering it from the tetrahydronaphthalene remaining liquid. The proportion of the amounts of purified naphthalene and hydrogenated naphthalene depends upon the amount of initial material passed through the reaction vessel in the unit of time. At a small throughput the initial material becomes hydrogenated to a large extent, tetrahydronaphthalene thus being formed, while at a higher throughput the yields in hydrogenated naphthalene are only small. The purified naphthalene obtained according to the aforedescribed manner of working is purer than the pure naphthalene usual in trade. It contains only about 0.003 percent of sulphur and is practically free from phenols, basic substances, coumarones and the like. Its solution in sulphuric acid shows at the most a slight coloration. The tetrahydronaphthalene obtained in addition thereto may be used without further working up for any purpose desired. The proportion of the amounts of purified and hydrogenated naphthalene may also be varied by changing the pressure. Thus at higher pressures larger amounts of tetrahydronaphthalene are obtained while at less elevated pressures the yield in unhydrogenated naphthalene becomes greater.

If crude naphthalene is treated at a temperature of 330° C. under otherwise the same conditions a very pure naphthalene is obtained without substantial formation of hydrogenated products. The purified naphthalene contains only about 0.005 percent of sulphur, whilst the pure naphthalene as usual in commerce contains about from 0.07 to 0.1 percent of sulphur. It solidifies at the same temperature as the latter, namely at 79.8° C.

Other crude polynuclear aromatic hydrocarbons, such as anthracene or phenanthrene, may be purified in the same manner.

What we claim is:—

1. A process for the purification of a crude polynuclear aromatic hydrocarbon which comprises treating said hydrocarbon with a gas comprising essentially hydrogen and in the presence of a hydrogenating catalyst immune against poisoning by sulphur and comprising essentially an oxide of a heavy metal, at a temperature between 280° and 350° C. and under a pressure above 10 atmospheres the conditions of temperature, pressure, activity of the catalyst and duration of treatment being so selected that no substantial decomposition of the said hydrocarbon into lower molecular products takes place and that purification is effected without hydrogenation of a substantial portion of said hydrocarbon.

2. A process for the purification of crude naphthalene which comprises treating said naphthalene with a gas comprising essentially hydrogen and in the presence of a hydrogenating catalyst immune against poisoning by sulphur and comprising essentially an oxide of a heavy metal, at a temperature between 280° and 350° C. and under a pressure above 10 atmospheres the conditions of temperature, pressure, activity of the catalyst and duration of treatment being so selected that no substantial decomposition of the naphthalene into lower molecular products takes place and that purification is effected without hydrogenation of a substantial portion of the naphthalene.

3. A process for the purification of a crude polynuclear aromatic hydrocarbon which comprises treating said hydrocarbon with a gas comprising essentially hydrogen and in the presence of a hydrogenating catalyst immune against poisoning by sulphur and comprising essentially an oxide of a heavy metal, at a temperature between 280° and 320° C. and under a pressure between 40 and 150 atmospheres the conditions of temperature, pressure, activity of the catalyst and duration of treatment being so selected that no substantial decomposition of the said hydrocarbon into lower molecular products takes place and that purification is effected without hydrogenation of a substantial portion of said hydrocarbon.

4. A process for the purification of crude naphthalene which comprises treating said naphthalene with a gas comprising essentially hydrogen and in the presence of a hydrogenating catalyst immune against poisoning by sulphur and comprising essentially an oxide of a heavy metal, at a temperature between 280° and 320° C. and under a pressure between 40 and 150 atmospheres the conditions of temperature, pressure, activity of the catalyst and duration of treatment being so selected that no substantial decomposition of the naphthalene into lower molecular products takes place and that purification is effected without hydrogenation of a substantial portion of the naphthalene.

MATHIAS PIER.
WALTER SIMON.